Sept. 15, 1970
M. C. DOBBS
3,528,562
LOG UNLOADING AND FEED APPARATUS
Filed April 14, 1969
2 Sheets-Sheet 1
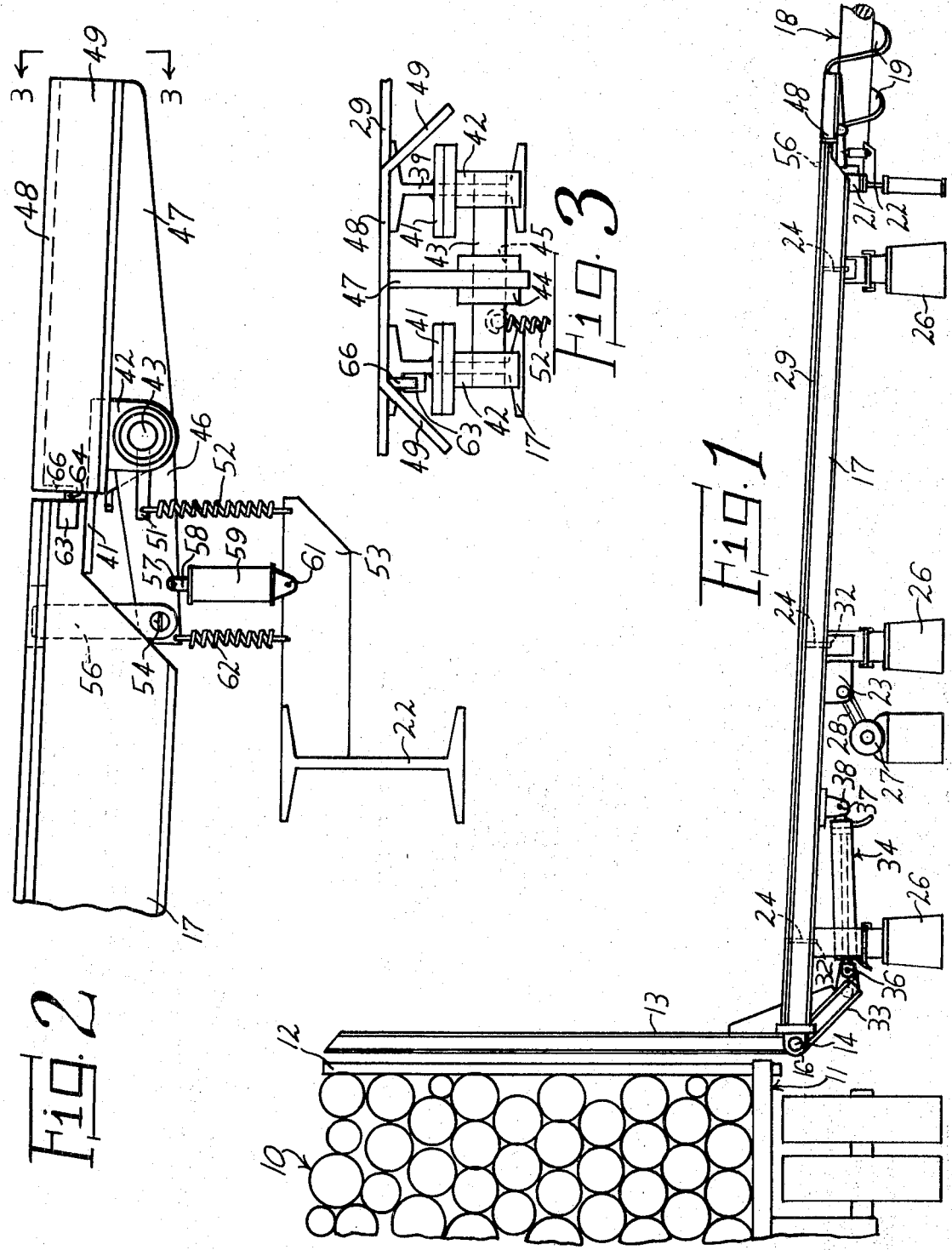
INVENTOR.
Marvin C. Dobbs
BY
Jennings Carter & Thompson
Attorneys INVENTOR.
Marvin C. Dobbs
BY
Jennings, Carter & Thompson
Attorneys United States Patent Office 3,528,562
Patented Sept. 15, 1970

3,528,562
LOG UNLOADING AND FEED APPARATUS
Marvin C. Dobbs, Fayette, Ala., assignor, by mesne assignments, of one-half to Alco Machine Shops, Incorporated, a corporation of Alabama
Filed Apr. 14, 1969, Ser. No. 815,629
Int. Cl. B65g 67/24
U.S. Cl. 214—1  10 Claims

ABSTRACT OF THE DISCLOSURE

Elongated transfer members pivotally mounted at lower ends alongside pile of logs and movable from upstanding, log restraining position to outer, log receiving position. Log support members extend between transfer members and receiving conveyor with means imparting movement to logs toward conveyor. Actuating member adjacent conveyor engages log moving thereon to restrain movement of next log onto conveyor until first log disengages actuating member.

BACKGROUND OF THE INVENTION

This invention relates to log unloading and feed apparatus and more particularly to apparatus for unloading logs laterally from a pile thereof at a first location and then feeding the logs sequentially to a second location.

Heretofore in the art to which my invention relates, difficulties have been encountered in unloading log-like members from vehicles and the like and then feeding the members in a direction transversely of the length thereof to other log handling equipment for subsequent processing. This is especially true since it is not only difficult to unload and feed the logs in parallel relation to each other but it is also difficult to feed one log at a time from a mass or pile of logs. Manual unloading and feeding of the logs one at a time is a very arduous and time consuming task which requires considerable labor, thus increasing the cost of handling the log-like members.

BRIEF SUMMARY OF INVENTION

In accordance with my invention, I provide elongated transfer members pivotally mounted at their lower ends alongside a pile of log-like members and movable from an upstanding, log restraining position to an outer, log receiving position. Log support members receive the log-like members from the transfer members whereby the logs are moved toward a conveyor for subsequent processing. An actuating member mounted adjacent the conveyor engages a log as it moves thereon to restrain movement of the next log onto the conveyor until the first log disengages the actuating member.

Apparatus embodying features of my invention is illustrated in the accompanying drawings, forming a part of this application, in which:

FIG. 1 is a side elevational view, partly broken away and in section, showing the position of the apparatus prior to receiving logs from a pile carried by a vehicle;

FIG. 2 is an enlarged, fragmental view showing the feed control actuating member mounted adjacent the discharge end of the log support member and the receiving end of the conveyor;

FIG. 3 is a fragmental end view taken generally along the line 3—3 of FIG. 2.

Figure 4:
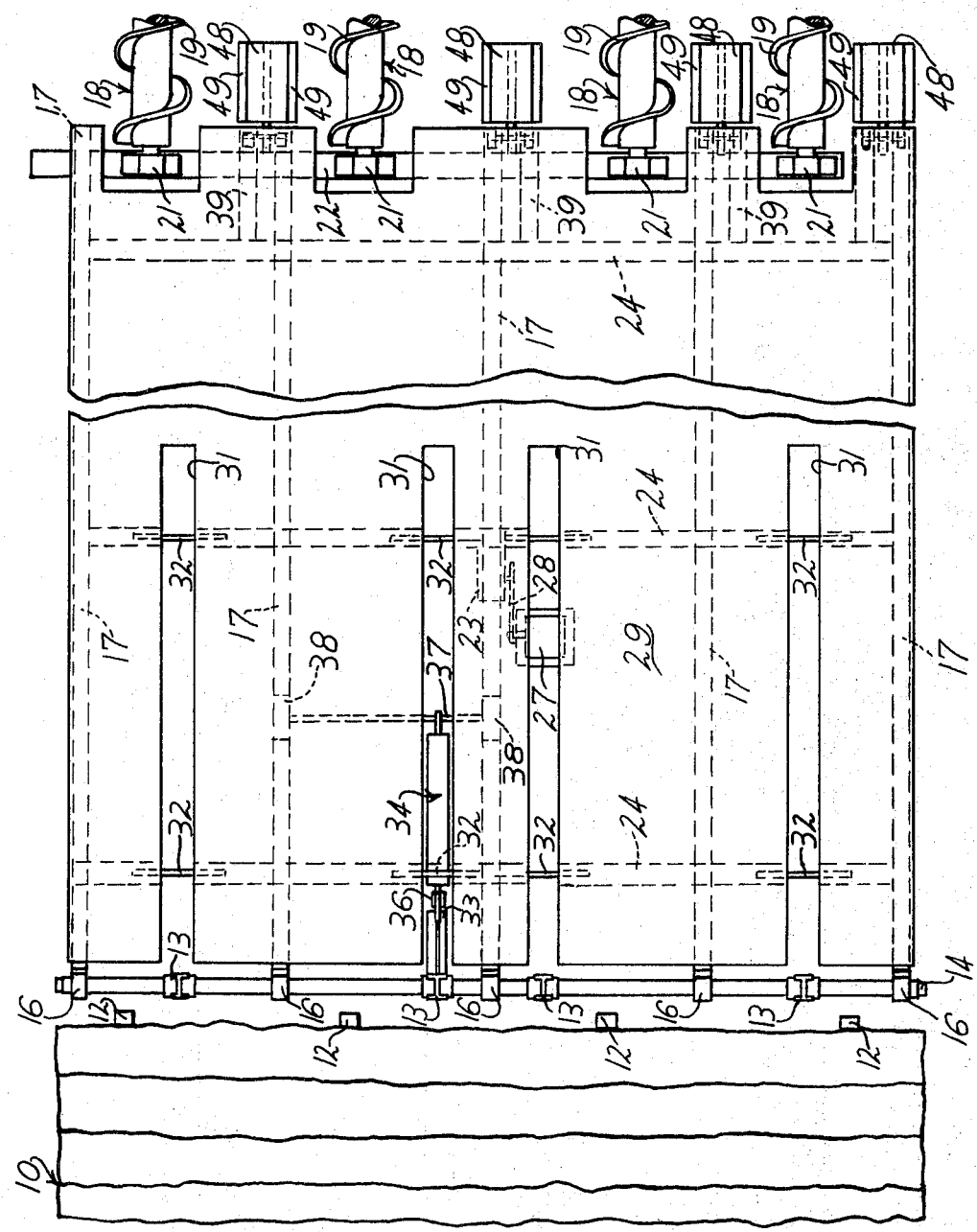
FIG. 4 is a top plan view of the apparatus shown in FIG. 1.

Referring now to the drawings for a better understanding of my invention, I show a pile of log-like members 10 which may be carried by a vehicle 11, as shown in FIG. 1. The logs may be retained on the vehicle 11 by any suitable means, such as by upstanding bolsters 12, chains or the like, in a manner well understood in the art. My apparatus is particularly adapted for use in handling logs which are unloaded from the vehicle 11 and transferred sequentially to a conveyor which in turn delivers the logs for subsequent processing, such as cutting the logs into predetermined lengths for use as pulpwood.

My improved apparatus for unloading the logs from the vehicle 11 comprises a plurality of elongated, transfer members 13 which may be in the form of I-beams or the like. The lower ends of the transfer members 13 are secured rigidly to an elongated shaft-like member 14 which extends alongside the pile of logs 10, as shown in FIGS. 1 and 4. The shaft-like member 14 is mounted in suitable bearings 16 whereby the elongated transfer members 13 are adapted to move from an upstanding log retaining position to a lower log receiving position outwardly of the pile of logs 10 whereby, upon removal of the bolsters 12, the logs are released and move from the pile 10 onto the transfer members 13 upon movement of the transfer members to the lower position.

The bearings 16 supporting the shaft-like member 14 are mounted at the forward ends of elongated support members 17 which are spaced laterally from each other, as shown in FIG. 4, and extend in a direction generally perpendicular to the shaft-like member 14 with the discharge ends of the support members 17 terminating adjacent the receiving end of a conveyor unit indicated generally at 18. The conveyor unit 18 is shown as comprising a plurality of laterally spaced, spiral-like conveyor members 19 which are supported in suitable bearings 21 carried by suitable supports 22.

As shown in FIG. 1, the elongated support members 17 slope downwardly away from the pile 10 whereby gravity aids in moving the logs transversely of their length toward the lower discharge end of the support members 17. To further aid in moving the logs along the elongated support members 17, I mount a vibrator unit 23 on the under surface of the support members 17 whereby the support members are vibrated. The elongated support members 17 are supported by suitable transverse support members 24 which in turn are supported by upstanding supports 26, as shown in FIG. 1. Since the elongated support members 17 are secured rigidly to each other by the transverse supports 24, the entire group of support members 17 are vibrated as a unit. The vibrator unit 23 is driven by a suitable power unit 27 which is operatively connected to the vibrator unit 23 by a flexible drive 28.

As shown in FIGS. 1 and 4, a plate 29 extends across and is secured to the members 17 to provide a substantially continuous log supporting surface which extends from the shaft-like member 14 to a point adjacent the receiving end of conveyor unit 18. As shown in FIG. 4, elongated openings 31 are provided in the plate 29 for receiving the elongated transfer members 13 upon movement of the transfer members 13 to a lower position. As shown in FIG. 4, the transverse support beams 24 are cut away adjacent the elongated openings 31 in the plate 29 whereby the elongated transfer members 13 move to a position beneath the upper surface of plate 29 to thus permit free movement of the logs down the sloping plate 29 after the transfer members 13 have been moved to lowered position. The cut away ends of the transverse beams 24 are connected to each other beneath each elongated opening 31 by a connector member 32 which is located adjacent the lower surface of the transverse members 24 to thus support and limit downward movement of the transfer members 13.

To move the elongated transfer members 13 selectively from the upstanding position shown in FIGS. 1 and 4 to a lower position within the elongated openings 31, a downwardly projecting bracket 33 is secured to the lower end of the shaft-like member 14, as shown in FIGS. 1 and 4. One end of a hydraulic unit 34 is attached to the downwardly extending bracket 33 as 36 while the other end of the hydraulic unit 34 is connected to a shaft 37 supported by suitable bearings 38.

As shown in FIG. 4, support beams 39 are secured to the undersurface of plate 29 in spaced relation to the discharge ends of the elongated support beams 17. Secured to the ends of the support members 17 and the support beams 39, as shown in FIGS. 2 and 3 are outwardly extending support brackets 41 which are connected to depending bearing members 42 which support opposite ends of a shaft 43. Clevis members 44 carried by a movable bracket 46 surround the shaft 43, as shown in FIG. 3 whereby the shaft 43 is adapted for rotation within openings 45 in the clevis member. Secured rigidly to the shaft 43 between the clevis elements 44 is a vertically extending bracket 47 which is secured to the under surface of a plate-like member 48 having depending sides 49, as shown in FIG. 3.

Also secured rigidly to the shaft 43 is one end of a laterally projecting arm 51 having its other end connected to a tension spring 52. The lower end of tension spring 52 is connected to a bracket 53 carried by support member 22 whereby the shaft 43 is urged in a counter-clockwise direction, as viewed in FIG. 2. That is, the plate-like member 48 is urged toward an upward position. Pivotally connected to the movable bracket 46 by a pivot pin 54 is an upstanding pin 56 which is adapted to move from the position shown in FIG. 2 to the dotted line position shown in FIG. 1 to serve as a stop to restrain movement of the logs 10 beyond the pins 56 until the pins are lowered.

Pivotally connected to the movable bracket 46 by a pivot pin 57 is the armature 58 of an electrical solenoid 59. The lower end of solenoid 59 is pivotally connected by a pivot pin 61 to bracket 53, as shown. The electrical solenoid 59 is of the type that, when energized, the armature 58 moves upwardly to thus move bracket 46 and the pin 56 carried thereby to the upper position, as shown in dotted lines in FIG. 1. A tension spring 62 is connected to the bracket 53 and the end of bracket 46 carrying the pin 56, as shown in FIG. 2, to urge the pin 56 toward its lower position after the solenoid 59 is deenergized.

A suitable switch element 63 is mounted adjacent the discharge end of support members 17 and is provided with a plunger element 64 which is in position to engage a vertically extending bracket 66 carried by the plate-like member 48 whereby upon moving the plate-like member 48 downwardly, the plunger moves outwardly to energize switch element 63. Switch element 63 is electrically connected to solenoid 59 whereby upon energizing the switch element 63, current is supplied to solenoid 59 to thus elevate pin 56. The plate-like member 48 and the mechanism associated therewith defines an actuating member which is depressed each time a long 10 moves into engagement with plate-like member 48 whereby the pin 56 operatively connected to each plate-like member 48 is elevated to restrain movement of the next log 10 onto the plate-like member 48 until the first log has moved out of engagement with plate-like member 48. While I have shown the movable bracket 46 as being movable by the solenoid 59, it will be apparent that the movable bracket 46 may also be pivoted to a position to elevate the pin 56 by the weight of a log as it moves onto the plate-like member 48 by securing the movable member 46 to the plate-like member 48. After the log moves out of contact with the plate-like member 48 the spring 62 would then return the bracket 46 to the position shown in FIG. 2, whereupon the pin 56 would be lowered.

From the foregoing description, the operation of my improved apparatus will be readily understood. To unload the pile of loks 10, the bolsters 12 are removed whereupon the logs are restrained against outward movement by the upstanding transfer members 13. With the bolsters 12 thus removed, fluid under pressure is introduced into the hydraulic unit 34 to extend the hydraulic unit 34 whereupon the extension of the hydraulic unit and the weight of the logs urges the transfer members 13 toward a downward and outward position. Upon movement of the transfer members 13 to the fully downward position, whereupon the transfer members 13 engage the transverse members 32, the upper surfaces of the transfer members 13 are below the upper surface of plate 29, thus permitting the logs to move down the sloping plate 29 toward the conveyor unit 18. The vibrator unit 23 is energized to impart vibration to the plate 29 whereupon the logs move in tandem toward the discharge end of support members 17. Upon engagement of the first log with the plate-like member 48, the plate-like member moves downwardly to thus release plunger 64 which causes the contacts of switch element 63 to be closed whereby the solenoid 59 is energized to move the pin 56 to the elevated position, as shown in dotted lines in FIG. 1. Accordingly, the next log is stopped from moving onto the plate-like member 48 until the first log has moved out of engagement with plate-like members 48. The cycle of operation is thus repeated each time a log moves into engagement with the plate-like members 48 whereby the logs are fed one at a time onto the conveyor unit 18. The conveyor unit 18 then transfers the logs thus delivered thereon to a suitable location for further processing.

From the foregoing, it will be seen that I have devised improved apparatus for unloading logs laterally from a pile thereof and then feeding the logs sequentially to a predetermined location. By providing positive means for unloading the pile of logs from the vehicle, the logs are maintained in parallel alignment with each other as they are delivered onto the supporting plate 29. Also, by providing the actuating member which restrains movement of a log onto the conveyor unit 18 until the preceeding log has moved out of engagement with the actuating member, I control accurately and in a positive manner, the sequential feed of one log at a time onto the conveyor unit 18. Furthermore, by sloping the elongated support members 17 and providing the vibrating unit 23 therefor, the logs are conveyed in a uniform manner toward the discharge end of the support members 17 and at the same time tne stop pin 56 restrains movement of the logs until the preceeding log moves out of engagement with the plate-like member 48.

While I have shown my invention in but one form, it will be obvious to those skilled in the art that it is not so limited, but is susceptible of various other changes and modifications without departing from the spirit thereof.

What I claim is:

1. In apparatus for unloading logs laterally from a pile thereof at a first location and then feeding the logs sequentially to a second location:

(a) a log transfer member mounted for pivotal movement adjacent one end alongside said pile for movement from an upstanding log retaining position alongside said pile to a lower log receiving position outwardly of said pile so that the logs are released and move from said pile onto said transfer member upon movement of said transfer member to said lower position, (b) a log support member extending between said transfer member and said second location in position to receive logs from said transfer member, (c) means imparting movement to said logs transversely of the length thereof while said logs are supported on said transfer member and said support member so that the logs are moved in a direction away from said pile and toward said second location, (d) a conveyor at said second location in position to receive logs from said support member, (e) an actuating member mounted adjacent the receiving end of said conveyor in position to be engaged and actuated by each log as the log moves thereon to retain said actuating member in a first position until the log passes out of engagement with said actuating member whereupon said actuating member moves to a second position, and (f) a log stop member adjacent the discharge end of said log support member operable to restrain movement of a log onto said conveyor while said actuating member is in said first position and operable to release a log for movement onto said conveyor upon movement of said actuating member to said second position.

2. In apparatus for unloading logs laterally from a pile thereof at a first location and then feeding the logs sequentially to a second location as defined in claim 1 in which the log transfer member comprises:

(a) a shaft-like member extending alongside said pile of logs, (b) a plurality of elongated members mounted in longitudinally spaced relation to each other along said shaft-like member and adapted for rotation therewith, and (c) power means operatively connected to said shaft-like member for rotating said shaft-like member to position said elongated members carried thereby selectively in said upstanding log retaining position and said lower log receiving position.

3. In apparatus for unloading logs laterally from a pile thereof at a first location and then feeding the logs sequentially to a second location as defined in claim 2 in which the power means comprises:

(a) a laterally projecting arm secured at one end to said shaft-like member, and (b) a fluid pressure operated power unit connected at one end to the other end of said arm.

4. In apparatus for unloading logs laterally from a pile thereof at a first location and then feeding the logs sequently to a second location as defined in claim 2 in which the log support member comprises:

(a) elongated beam-like members extending generally parallel to the elongated transfer members while said elongated transfer members are in said lower log receiving posion.

5. In apparatus for unloading logs laterally from a pile thereof at a first location and then feeding the logs sequentially to a second location as defined in claim 4 in which one end of each beam-like member extends alongside and overlaps the adjacent elongated transfer member.

6. In apparatus for unloading logs laterally from a pile thereof at a first location and then feeding the logs sequentially to a second location as defined in claim 5 in which the beam-like members extend from the location of pivotally mounting the transfer members to a location adjacent said conveyor.

7. In apparatus for unloading logs laterally from a pile thereof at a first location and then feeding the logs sequentially to a second location as defined in claim 4 in which the beam-like members slope downwardly toward said conveyor and the means inparting movement to said logs transversely of the lengths thereof comprises a vibrator unit operatively connected to said beam-like members.

8. In apparatus for unloading logs laterally from a pile thereof at a first location and then feeding the logs sequentially to a second location as defined in claim 1 in which said actuating member comprises:

(a) at least one plate-like member mounted adjacent the receiving end of said conveyor with a portion of said plate-like members being adapted for downward movement to said first position upon engagement with a log, and (b) resilient means urging said portion of said plate-like member upwardly so that said plate-like member returns to said second position after the log moves out of engagement with said plate-like member.

9. In apparatus for unloading logs laterally from a pile thereof at a first location and then feeding the logs sequentially to a second location as defined in claim 8 in which said plate-like member is operatively connected to a vertically movable stop member to raise said stop member upon movement of said plate-like member to said first position and to lower said stop member upon movement of said plate-like member to said second position.

10. In apparatus for unloading logs laterally from a pile thereof at a first location and then feeding the logs sequentially to a second location as defined in claim 9 in which said stop member is a vertically movable pin.

References Cited

UNITED STATES PATENTS 2,290,844   7/1942   Smith _____ 214—44

FOREIGN PATENTS 1,000,147   8/1965   Great Britain.

GERALD M. FORLENZA, Primary Examiner

GEORGE F. ABRAHAM, Assistant Examiner

U.S. Cl. X.R.

214—8.5, 44